Aug. 7, 1928.　　　　　　　　　　　　　　　　　1,679,429
R. F. KRAUSE
HANDLE FOR WATERLESS COOKERS
Filed Sept. 23, 1927

Inventor
R. F. Krause
By Frank A. Bond
Attorneys

Patented Aug. 7, 1928.

1,679,429

UNITED STATES PATENT OFFICE.

RICHARD F. KRAUSE, OF MASSILLON, OHIO, ASSIGNOR TO THE ENTERPRISE ALUMINUM COMPANY, OF MASSILLON, OHIO, A CORPORATION OF OHIO.

HANDLE FOR WATERLESS COOKERS.

Application filed September 23, 1927. Serial No. 221,466.

The invention relates to handles for the covers of cooking utensils and the like, and more particularly to the covers of waterless cookers and similar articles wherein the cover is adapted to fit tightly into the open upper end of the vessel, thereby requiring the provision of a substantial handle for placing the cover upon the utensil and removing it therefrom.

The object of the improvement is to provide a handle for the cover of such a utensil, which permits the handle to be grasped by both hands, if necessary, in order to place the same upon the vessel or to remove it therefrom.

The above and other objects may be attained by providing a single strip or band of metal, attached at its ends to diametrically opposite portions of the cover, near the periphery thereof, at a point, or points, near the center of the cover, the portions of the strip or band between the center and periphery of the cover being curved upward away from the cover, forming a hand gripping portion at each side of the center.

Figure 2:
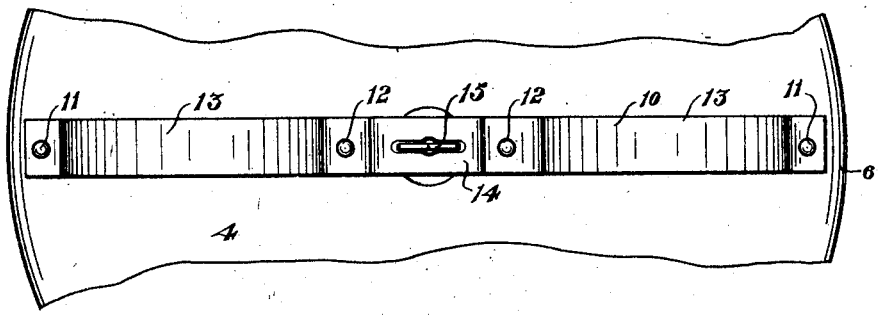
Figure 1:
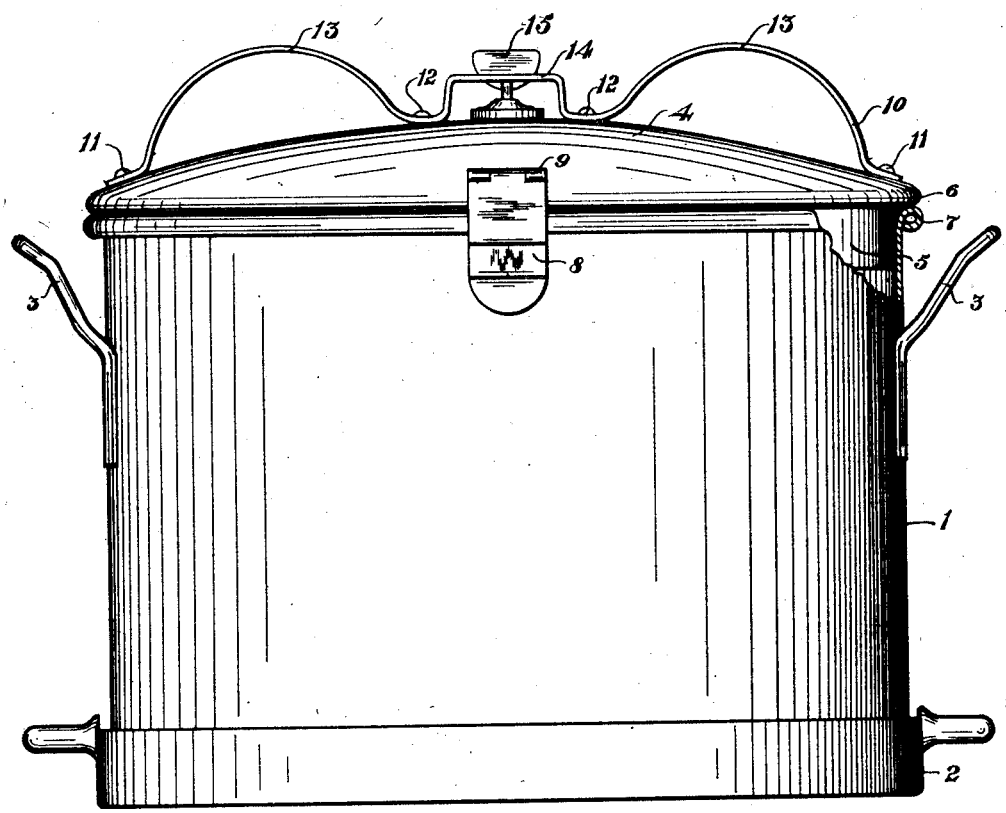

An embodiment of the invention is illustrated in the accompanying drawing, in which Figure 1 is a side elevation of a waterless cooker provided with a lid or cover having thereon the improved handle to which the invention pertains, and Fig. 2, a fragmentary top plan view of a portion of the cover, showing the improved handle in plan.

Similar numerals refer to similar parts throughout the drawing.

The cooking utensil 1, may be of any suitable design, and may be of the waterless cooker type, as illustrated, being adapted to rest upon a base 2, arranged to be placed over a fire or stove burner. Handles 3 may be provided upon the vessel for picking the same up and moving it from place to place, independently of the base.

The lid or cover 4 of the utensil may be convex, as shown, and is preferably provided with the depending flange 5, adapted to fit snugly within the upper open end of the vessel, and having the peripheral shoulder 6 arranged to contact with the peripheral bead 7 at the mouth of the vessel.

For the purpose of tightly clamping the cover upon the receptacle, in order to prevent the escape of vapors, and loss of flavor, from the cooking food, clamps 8 may be hingedly connected to the cover, as at 9, and arranged to engage under the peripheral bead 7 of the vessel The improved handle, to which the invention pertains, is preferably formed of a single strip or band 10, of metal, connected at opposite ends to diametrically opposite, peripheral portions of the cover, as by the rivets 11, or the like.

At its central portion, the band or strip 10 may be attached to the central part of the cover 4, as by the rivets 12, the portions of the band between the center and each end being curved upward, away from the cover, forming the hand grips 13, each of which is suitable for grasping with one hand.

It desired, the center of the band or strip 10, between the rivets 12, may be formed into substantially an inverted U-shape 14, in order to provide for the location of a steam valve 15 in the center of the cover.

As it is well known that covers for vessels of this character must fit tightly upon the receptacles, it will be seen that a substantial handle gripping surface must be provided in order to place the cover upon the utensil and remove it therefrom.

The double handle described above, and illustrated in the accompanying drawing provides sufficient gripping surface to permit grasping the same by both hands, if necessary, upon diametrically opposite sides of the center of the cover, whereby the cover may be quickly and easily placed tightly upon the vessel or removed therefrom.

The formation of the double handle described above, may be conveniently stated by saying that the strip has in sequence intermediate its ends, an end connection portion, a curved end portion, a central connection portion, an inverted U-shaped central portion, a second central connection portion, a second curved end portion, and a second end connection portion.

I claim:

In combination with a cover for a cooking utensil and the like, a handle comprising a strip of metal and having in sequence intermediate its ends, an end connection portion, a curved end portion, a central connection portion, an inverted U-shaped central portion, a second central connection portion, a second curved end portion, and a second end connection portion, and means connecting the end connection portions and the central connection portions to the cover, the curved end portions being curved away from the cover forming hand grips, and the U-shaped central portion forming a valve mounting.

In testimony that I claim the above, I have hereunto subscribed my name.

RICHARD F. KRAUSE.